United States Patent [19]
Oulevay et al.

[11] 3,788,736
[45] Jan. 29, 1974

[54] PROCEDURE AND DEVICE FOR SYNCHRONISING CINEMATOGRAPHIC CAMERAS WITH A PROJECTOR

[75] Inventors: Serge Oulevay, Yverdon; Jean Thevenaz, Grandson, both of Switzerland

[73] Assignee: Bolex International SA, Saint-Croix, Switzerland

[22] Filed: Sept. 15, 1972

[21] Appl. No.: 289,626

[30] Foreign Application Priority Data
Sept. 16, 1971  Austria ............................... 8071/71

[52] U.S. Cl..................... 352/180, 352/92, 352/137, 352/169
[51] Int. Cl. ......................................... G03b 21/48
[58] Field of Search .............. 352/92, 137, 169, 180

[56] References Cited
UNITED STATES PATENTS

| | | | |
|---|---|---|---|
| 1,910,995 | 5/1933 | Leventhal | 352/180 |
| 3,674,348 | 7/1972 | Figge | 352/180 X |
| 3,432,228 | 3/1969 | Hellmund | 352/169 |
| 1,944,024 | 1/1934 | Foster | 352/92 |
| 3,609,019 | 9/1971 | Tuber | 352/169 X |

*Primary Examiner*—Monroe H. Hayes

[57] ABSTRACT

A method and apparatus for synchronising the speed of filming of a cine-camera with the rate of a projector in which a marking is made on each frame of a movie film during shooting, this marking having characteristics corresponding with a certain image frequency in shooting, which markings can be read at the time of projection in order to control or provide control for the speed of projection.

6 Claims, 5 Drawing Figures

PATENTED JAN 29 1974
3,788,736
SHEET 1 OF 2
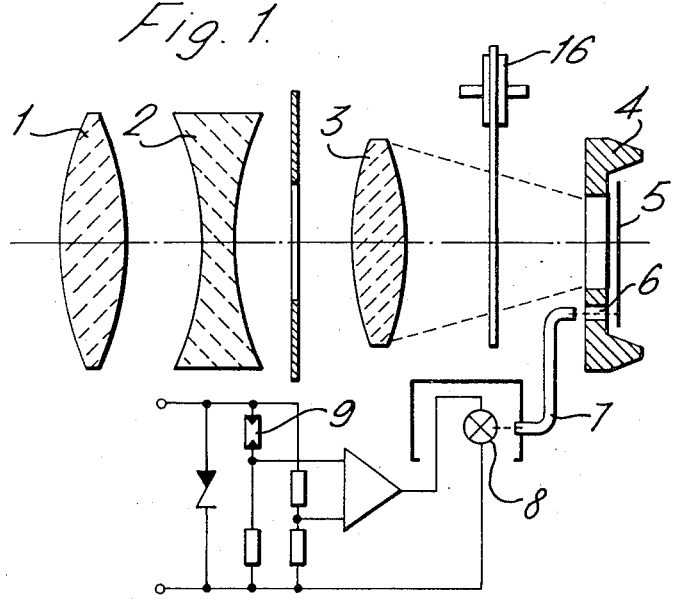
Fig. 1.
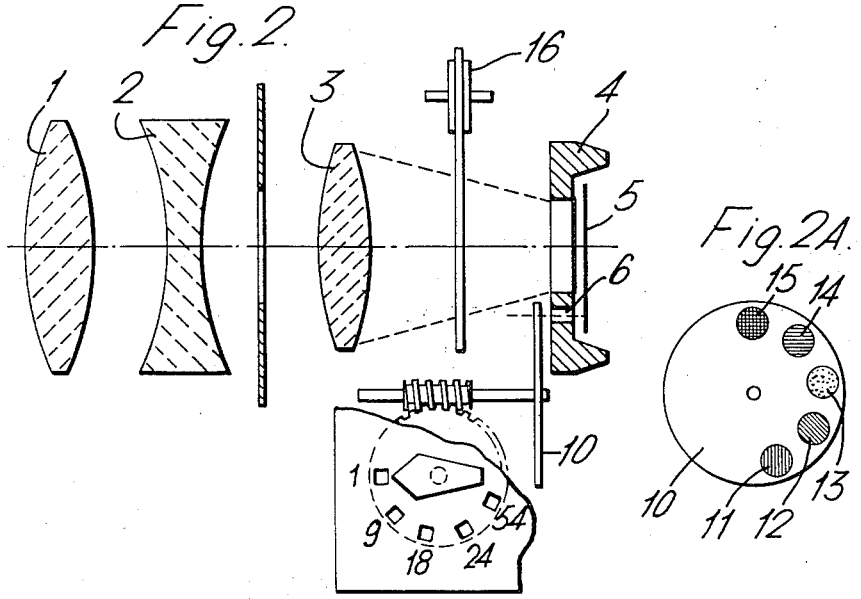
Fig. 2.
Fig. 2A.

PROCEDURE AND DEVICE FOR SYNCHRONISING CINEMATOGRAPHIC CAMERAS WITH A PROJECTOR

FIELD OF INVENTION

This invention relates to a method for synchronising cinematographic cameras and a means of applying said method.

The present invention provides a method of synchronising the speed of a camera shooting a film with that of a projector subsequently projecting the film.

BACKGROUND

Generally, such a synchronisation, i.e. between the speed taken by a camera when exposing a film and that of the images projected by a projector, is not desirable. Normally, it is preferable to produce certain effects by using a frequency when projecting different to that used when shooting.

In some cases, it is desirable to shoot the film more slowly than normal without wishing to produce a particular effect, e.g. simply to economise the film, or perhaps in particular lighting conditions. Thus, the lighting conditions encountered for example in churches do not enable the shooting of a film at the normal speed. But if the film is shot at half the normal speed, it is possible to increase the relative aperture. In the same way when a subject is brightly lit it is possible to double the speed at which the film is shot. In these cases it is desirable to synchronise the projector speed with the camera speed, i.e. when the film is projected, the projector must have the same speed as the camera when shooting.

SUMMARY OF INVENTION

The main object of the present invention is to provide a method by which an optical mark characteristic of the speed of the camera at the time of shooting can be made on the margin of each image. This mark is read at the time of projection and the speed adjusted accordingly.

Another principal object is to provide a camera with a source of light of constant luminosity, the rays of which are directed towards one of the edges of a frame. This edge can either be the longitudinal one or a transverse one perpendicular to the direction of the film displacement. If a constant luminosity is used, as different speeds produce different lengths of time during which the edge of the images are exposed, the brightness of the edge of the image varies according to the speed of filming. To avoid consuming an increased amount of electricity by producing this light, another solution according to an aspect of the invention would be to provide a marking device connected to the frequency control and having a certain number of masks or filters corresponding with the various speeds of filming. These masks or filters could be placed in the path of the rays directed towards the margin of the film. In this way the external light functions as a source of light, in which case the luminosity at the edge of the image is determined by the dimension of a marking or by the degree of blackening of a grey filter placed in the path of the light rays.

The marking described above could be adversely influenced by dirt particles adhering to the masks or filters. If this problem is encountered, a method of marking using colored filters should be used, in which a different color corresponds with each image frequency. Such markings are much less sensitive to external influences.

A projector fitted with a device for reading the markings on the edge of the images, according to this invention, is fitted with an energy transforming device, preferably a photoelectric transducer, the terminal of which is connected to the speed control means.

The invention, both as to its exemplary construction and the inventive method, together with additional objects and advantages thereof, shall be understood from the following detailed description when read in conjunction with the accompanying drawings in which:

FIGS. 1, 2 and 2 A represent schematically two alternate embodiments of a marking device in a cine-camera according to the invention;

FIGS. 3 and 4 represent schematically two alternate embodiments of the reading device in a projector according to the invention.

DETAILED DESCRIPTION

Figure 3:
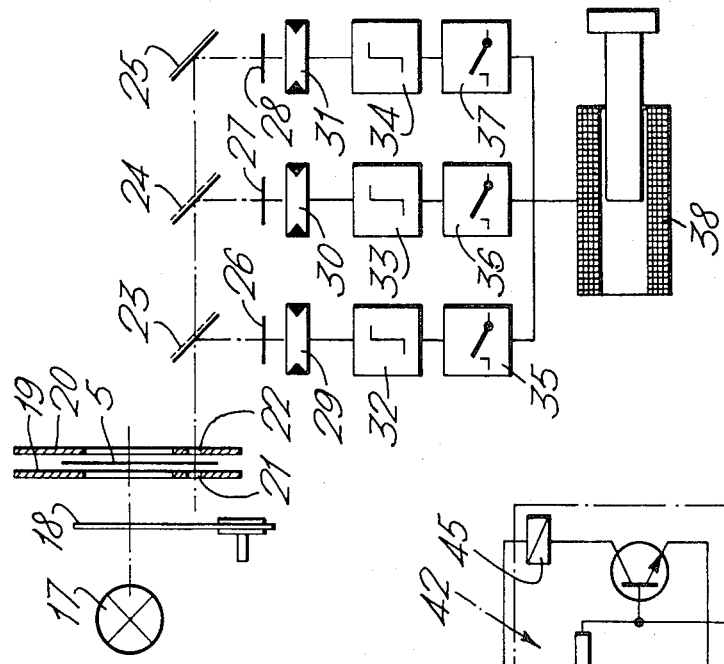

FIG. 1 shows a marking device in a cine-camera provided with an objective made up of the lenses 1, 2 and 3. In the path of the rays traveling through the objective is the channel 4 of the film 5, which presents an aperture 6 in line with the end of a light conductor 7. The light conductor 7 directs a beam of light from the light source 8 onto the edge of the film 5. The luminosity of the light source 8, which is, in the example described, a miniature lamp, is maintained at a constant level by a suitable circuit, represented diagramatically, which includes a photoresistant cell g, on which part of the rays from the lamp 8 continuously fall.

Depending on the speed of the film 5, the edge of the film opposite the opening 6 is exposed for a longer or shorter length of time thus producing a brighter or darker area. Thus, the luminosity of the marking area of the film is in proportion to the speed of shooting. Inversely, the speed of shooting can be determined from the luminosity of the edge of the film.

In a projector (further described below), a light beam is directed through the marked edge of the film. The speed control on the projector is fitted with a shaded filter graduated from grey to black. The position of the filter is adjusted until the luminosity of an opening through which shine the rays that have been through the marked film, is equal to that of a reference opening of constant luminosity. The change in position of the graduated filter adjusts the speed control. In order to avoid complications caused by dust particles on the filters, it is preferable to replace the variation of luminosity by a color code.

According to another embodiment of the invention, FIG. 2 shows a manual switch for the selection of image frequency, i.e. a device which allows the film to be projected either frame by frame or at the following speeds: 9, 18, 24, or 54 frames per second. This switch is connected to a disc 10 made up of a series of filters shown in detail in FIG. 2 A. On this disc there is a red filter 11, a green filter 12, a yellow filter 13, a blue filter 14, and an opaque area 15. The disc 10 is placed in the path of the marginal rays from the objective made up of the lenses 1, 2 and 3. At each rotation of the shutter a colored mark is made on the edge of the film 5. For example, when a film is being exposed at the rate of 54 frames per second, the opaque area 15 is opposite the aperture 6; when it is exposed frame by frame the filter 11 is opposite the aperture 6.

Similar to the embodiment shown in FIG. 1, the rate of projection is controlled by reading the marks on the edge of the film. These marks are projected through an opening and compared with a reference opening. The manual device (not shown) controlling the speed of projection is connected to a traveller visible in the reference opening and bearing the same colors as the disc 10. The rate of projection is correct when the colors are identical in the two openings.

FIG. 3 shows a projector fitted with an automatic device which reads the marks on the edge of the film 5 and adjusts the projection speed accordingly. A projection lamp 17 sends a beam onto the film 5. This beam is interrupted sequentially by a shutter 18. The projection opening is made up of two film-guiding plates 19 and 20. The plates bear two adjacent openings 21 and 22 which correspond with the edge of the film 5. Part of the rays from the source of light 17 pass through the openings 21 and 22. Behind these openings in the path of the rays are two semi-transparent mirrors 23 and 24 and a totally reflecting mirror 25. These three mirrors 23, 24 and 25 divide the rays which pass through the openings 21 and 22 and direct them through the filters 26, 27 and 28 onto photoelectric transducers, e.g. photoresistances or photo-diodes 29, 30 and 31 shown in FIG. 3.

If the frames have coded colored markings made by the marking device shown in FIG. 2, each differently colored mark on the film is analyzed by the filters 26, 27 and 28, e.g. red, blue and yellow. The filters are such that the colors red, blue or yellow produce an output signal on the photoelectric transformers 29, 30 or 31 respectively. A green mark gives a signal to the blue and yellow photoelectric transformers. If there is no mark, no signal is given to the transformers 29, 30 and 31. The photoelectric transformers 29, 30 and 31 are each connected in series with the threshold switches 32, 33 and 34 respectively, so that only one sufficiently powerful signal from one of the said transformers can be transmitted. The signals from the threshold switches are transmitted to the control circuits of the impulse generators 35, 36 and 37 respectively, each of which having a different frequency. These generators may be of any suitable design such as revolving discs bearing contacts which connect with fixed contacts. Another system could be envisaged without mechanical connections but having a revolving magnet fixed on an axle of the projector. The magnet would induce a magnetic flux in a coil or influence a field-effect resistance. In any case, the output signals from the impulse generators 35, 36 and 37 respectively produce series of impulses the frequency of which depends on the marking on the film 5 which caused the activity of one of the generators 35, 36 and 37.

An electro-magnet 38 is connected to the terminal of the impulse generators. This magnet is connected to the claw which makes the film move forward, in such a way as to prevent one cycle of movement when the magnet 38 is activated by an impulse. Further disclosure of the function and construction of magnet 38 appears in the Austrian Patent No. 282 351 and does not concern the present invention.

The result is that if the film is not marked, no impulse is transmitted to the magnet 38 and the film 5 moves forward at a maximum speed. Preferably yellow and blue markings are used to correspond with film frequencies of half and a third respectively of the normal speed. If the film bears a green mark, the impulse generators connected to the blue and to the green react simultaneously and both their frequencies are transmitted together. The red marking can be attributed to an impulse generator whose frequency corresponds with a minimum speed of projection, in this manner a red marking causes the film to cease moving forward. In this case the film can then be moved manually or a timing relay can be connected to this generator which prevents the said generator from interrupting the movement for the desired lapse of time.

Figure 4:
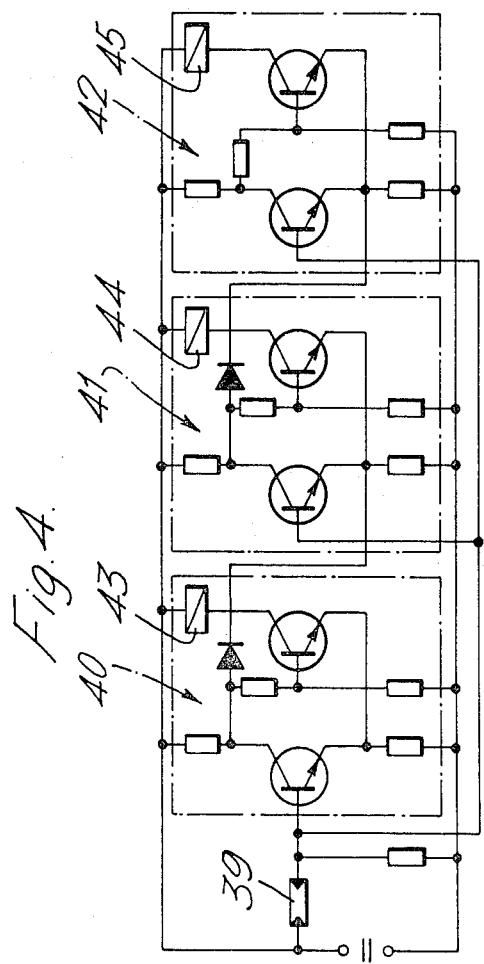

If the cine-camera is fitted with the marking device shown in FIG. 1, in which case the disc 10, shown in FIG. 2 bears filters which modify the intensity of light instead of colored filters, it is sufficient to place one totally reflecting mirror identical with mirror 25, behind the opening 22 (FIG. 3). This mirror directs the beam of light onto a photoelectric cell 39 (FIG. 4). This photoelectric cell is placed at the input of a circuit comprising several positions. Each of these positions corresponds with a different threshold. Such a circuit is described in the German DAS No. 916 534, therefore its full operation will not be further described herein. Depending on the level of the threshold one of the control circuits 40, 41 or 42 comes into action and all the others are blocked. Impulse generators such as those illustrated in FIG. 3 are connected to the terminals of the control circuits 40, 41 and 42 by means of the relays 43, 44 and 45 respectively. The relays 43, 44 and 45 may be replaced by electronic control circuits or electronic impulse generators.

Other variations of the embodiment of this procedure could be envisaged. The optical signals could be replaced by magnetic signals. Where the circuit represented in FIG. 4 is concerned several variations are possible. For example, a single threshold switch could be provided to which the signal would rapidly transmit various resistances through a circuit comprising several resistances. When the different resistances were switched on the different impulse generators would be switched on simultaneously. The impulse generator corresponding to the level at which the threshold switch responds would function. Another possibility would be the comparison of the signal with a reference signal in the form of steps or saw-teeth, where the switch from one impulse generator to another is made at the same time as an increase in the tension of the reference signal. Another possibility consists in putting the automatic light-meter out of action on the cine-camera when the filter 10 and the lamp 8 are functioning in order to shoot in bad lighting conditions using a lower speed which brings about longer exposure of each image. In all these cases, the procedure described in this invention reduces film consumption.

Other and further modifications can be made to the invention without departing from the spirit or scope thereof.

What we claim is:

1. A cine-camera including apparatus for synchronising the speed of shooting the cine-camera with the rate of a projector, said apparatus comprising means for applying a marking on each of successive frames of a movie film during shooting, which marking has characteristics corresponding with a predetermined image frequency in shooting and which marking can be read at the time of projection in order to regulate the speed of projection, said apparatus further comprising a device having a number of colored filters adapted to be positioned to intercept light directed onto the edge of the film and means for coupling said device to the camera speed control switch such that the colored filter positioned to intercept said light correponds with the selected camera speed.

2. A cine-camera as set forth in claim 1 wherein said means for applying a marking comprises a light cooperating with the objective shutter of the cine-camera and said colored filters to apply marginal interrupted markings on each frame of the movie film during shooting.

3. A cine-camera including apparatus for synchronising the speed of shooting the cine-camera with the rate of a projector, said apparatus comprising means for applying a marking on each of successive frames of a movie film during shooting, which marking has translucent characteristics corresponding with a predetermined image frequency in shooting and which marking can be read at the time of projection in order to regulate the speed of projection and wherein said means for applying a marking comprises means for applying light of constant luminosity on the edge of the film during shooting such that the speed of movement of the film determines the translucent characteristic of the marking that corresponds with the instantaneous image frequency of the film in shooting.

4. A cine-projector including apparatus for synchronising the speed of a projector with the speed of shooting of a cine-camera in which a marking is made on each frame of a movie film during shooting, which marking has color characteristics corresponding with a certain image frequency in shooting, said apparatus comprising reading means for reading said marking and producing an output signal which corresponds with the image frequency at the time of shooting so as to enable said output signal to operate a speed control device that controls the speed of the projector corresponding to the characteristics of said marking, said reading means comprising means for producing a light signal through the edge of the film bearing the marking, color filter selector means arranged to intercept the light transmitted by the marking and means for sensing the light from the color filter selector means to sense the color characteristic of the marking and thereby control the speed control device.

5. A cine-projector as set forth in claim 4 wherein said last mentioned means for sensing comprises a photo-electric cell and at least one threshold switch coupled to receive the output signal of the photo-electric cell.

6. A cine-projector as set forth in claim 4 wherein said last mentioned means for sensing comprises a number of photoelectric cells, each respectively coupled to operate a threshhold switch, and said last mentioned means for sensing further comprising a number of impulse generators for transmitting a series of impulses of different frequencies, each frequency thereof corresponding with a different color characteristic of the marking on the film.

* * * * *